United States Patent
Craske

[15] 3,692,362
[45] Sept. 19, 1972

[54] TIPPING TRAILERS

[72] Inventor: John B. L. Craske, The Old Hall, Ringsfield, near Beccles, England

[22] Filed: July 20, 1970

[21] Appl. No.: 56,389

[30] Foreign Application Priority Data

July 28, 1969 Great Britain..........37,685/69

[52] U.S. Cl....................................298/5, 280/478
[51] Int. Cl. ..............................................B60p 1/04
[58] Field of Search....................................298/5, 22

[56] References Cited

UNITED STATES PATENTS 2,623,602   12/1952   Double....................298/22 X

FOREIGN PATENTS OR APPLICATIONS 185,247   4/1956    Austria..........................298/5
872,740   4/1953    Germany......................298/5
903,305   2/1954    Germany......................298/5
852,854   11/1960   Great Britain...............298/22

Primary Examiner—A. Harry Levy
Attorney—Norris & Bateman

[57] ABSTRACT

A tipping trailer for use, for example, in industry and agriculture where frequent tipping and frequent hitching to and disconnection from towing vehicles is involved, such trailer having a drawbar assembly which, by reversing the towing vehicle to which the trailer is connected while the trailer chassis is held stationary is operable to effect tilting or tipping of the trailer body or platform.

7 Claims, 3 Drawing Figures

Inventor
John Bernard Lloyd Craske
Attorneys
By Norris + Bateman

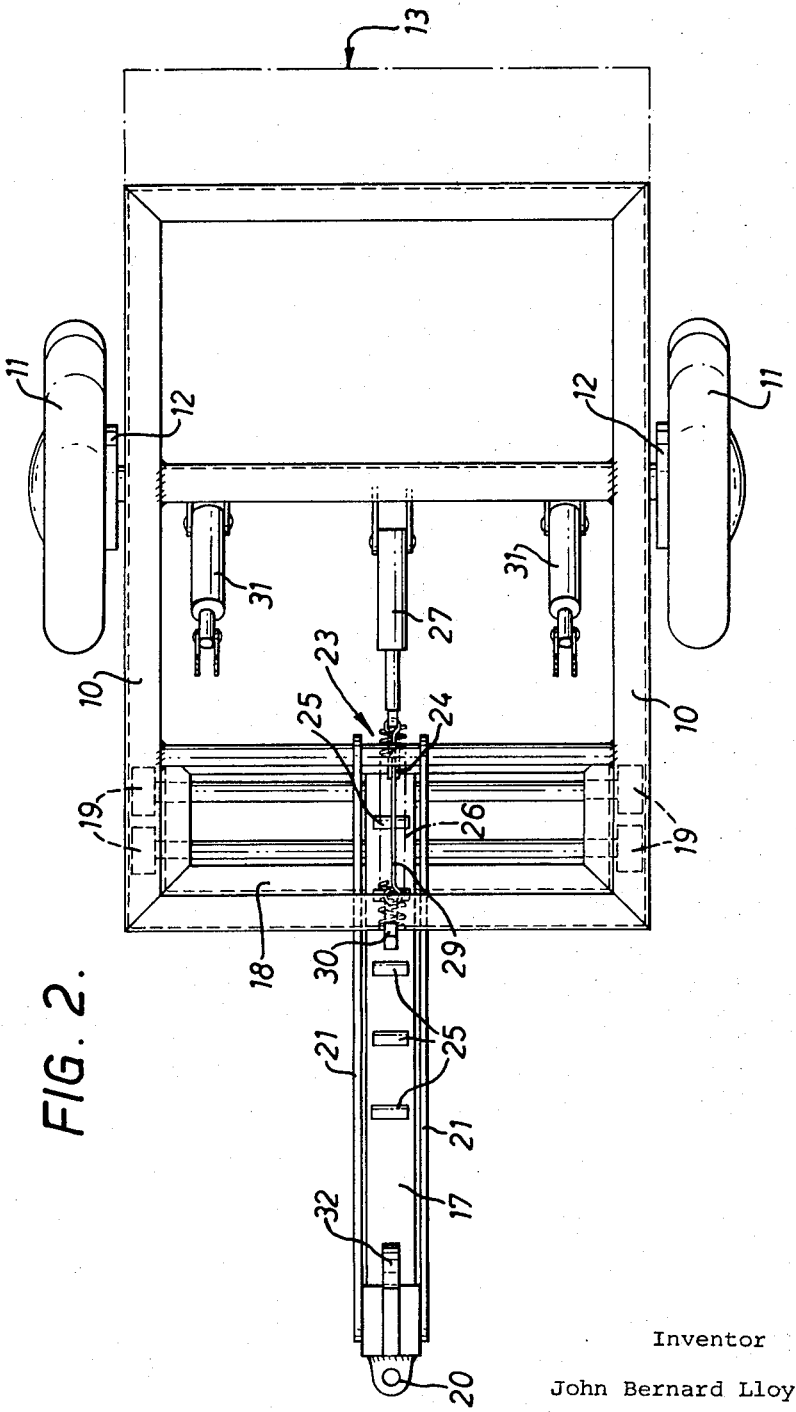

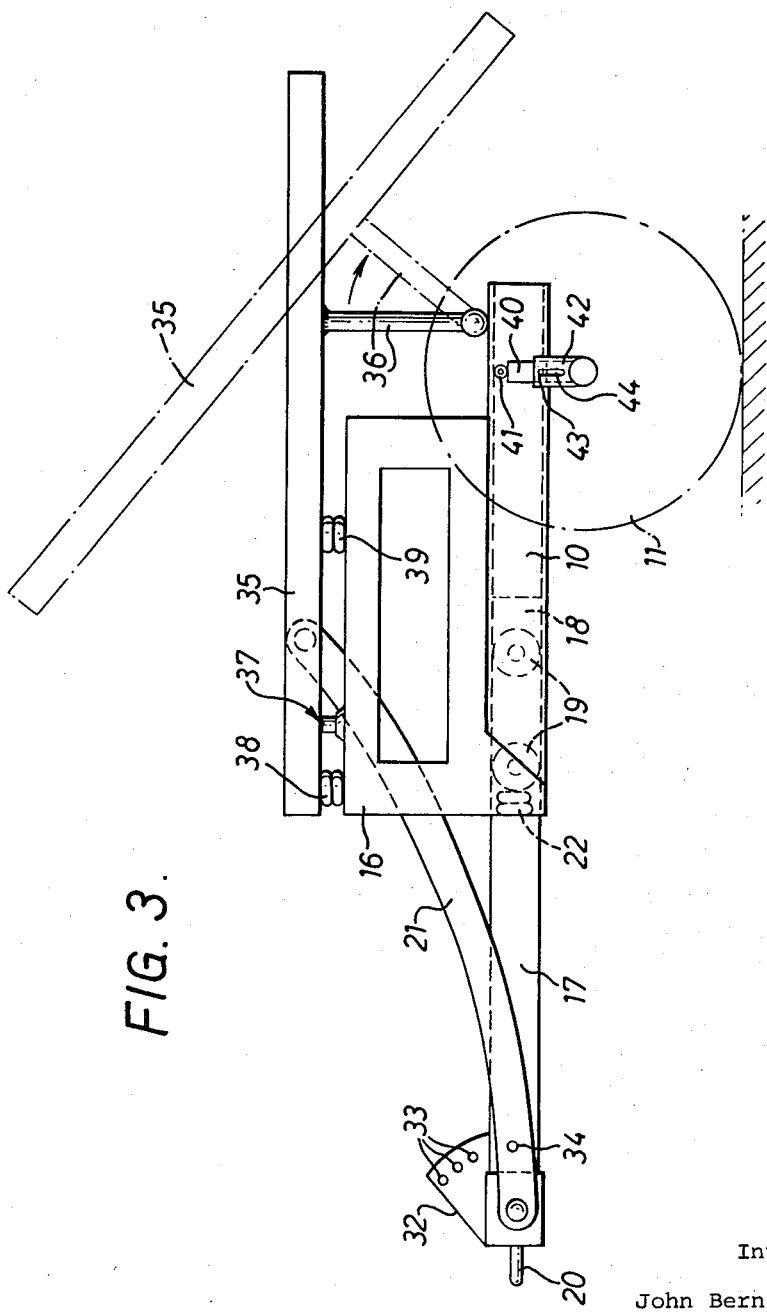

TIPPING TRAILERS

This invention relates to tipping trailers and provides a novel or improved form of tipping gear which is of simple construction and easy to operate and which can be produced at a substantially lower cost than the known tipping gears used on trailer vehicles.

According to the invention there is provided a tipping trailer provided with a drawbar assembly which, by reversing the towing vehicle to which the trailer is connected while the trailer chassis is held stationary, is operable to effect tilting or tipping of the trailer body or platform.

The invention will be described further by way of example, with reference to the accompanying drawings, in which:

FIG. 2 is a plan view of the trailer shown in FIG. 1; and

FIG. 3 is a diagrammatic side view of a further embodiment of the invention incorporating a number of modifications.

Figure 1:
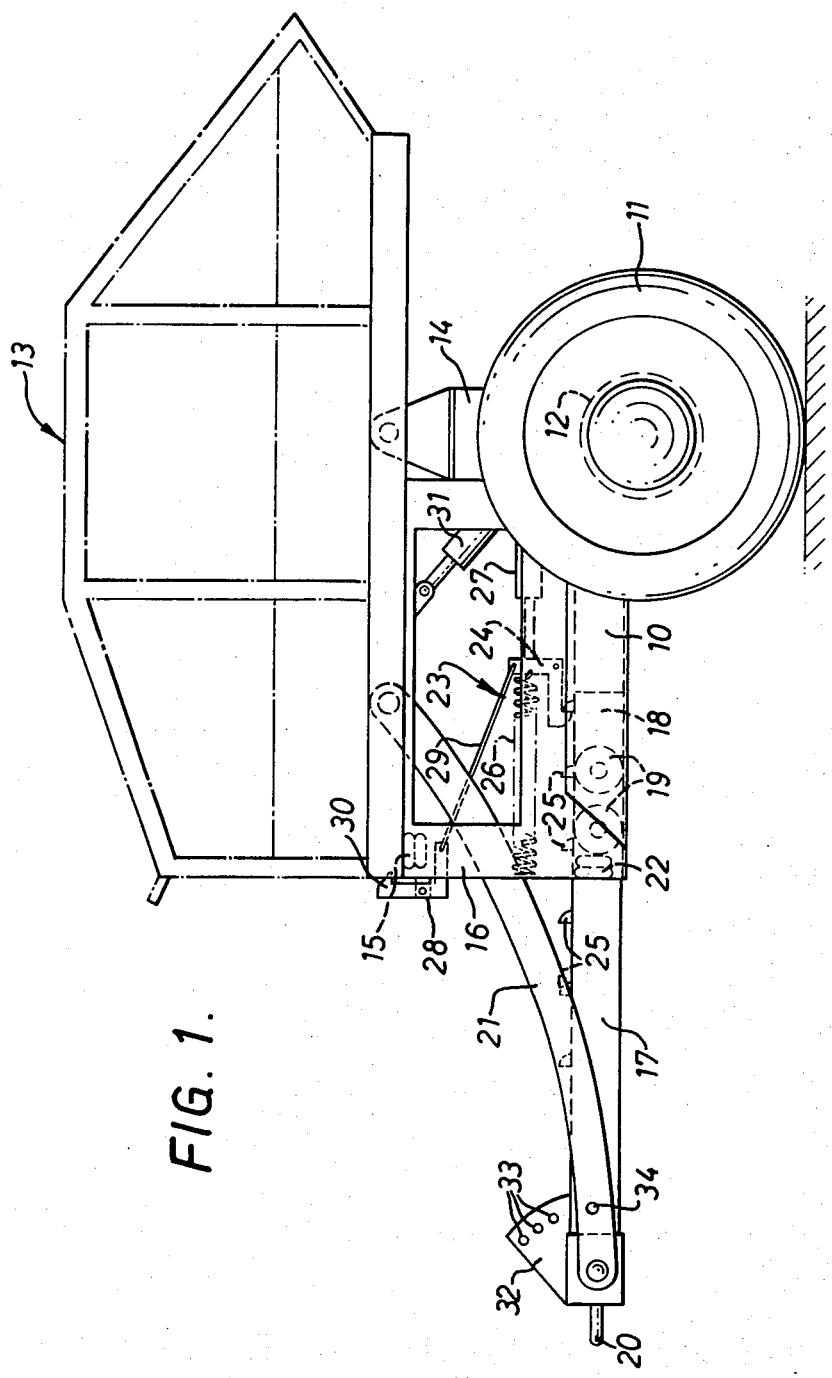
FIG. 1 is a side view of a trailer constructed in accordance with the invention.

FIGS. 1 and 2 of the drawings show a tipping trailer constructed according to the invention and comprising two longitudinally-extending chassis channel members 10 suitably cross-braced and supported in conventional manner upon a pair of ground wheels 11, the channel members 10 being so disposed that the openings between the webs are inwardly directed. The wheels 11 are fitted with brakes 12 adapted to be actuated via suitable means such as cables or hydraulic pipes (not shown). The load-carrying frame or platform 13 of the trailer (shown in broken outline) is fabricated from angle iron and/or channel members in any convenient manner and is pivotally mounted at each longitudinal side on a respective upstanding arm 14 carried on the trailer chassis so that it can tilt in a direction to discharge its load rearwardly, the platform 13 when in its lowered position resting at its forward end on resilient cushions 15 provided on a platform support 16 of the chassis.

The trailer further comprises a drawbar assembly including a central drawbar 17 rigidly welded at its rear end to a fabricated frame 18 carrying at each side a pair of rollers 19 adapted to ride in the chassis channel members 10. The forward end of the drawbar assembly is provided with a coupling eye 20 or equivalent means for connection to a tractor or other towing vehicle, whilst hinged to the drawbar 17 near its forward end are two parallel curved bars or struts 21 the rear ends of which are pivotally mounted on the platform 13 forward of the arms 14. Under normal towing conditions the drawbar frame 18 is located at the forward end of the channel members 10 with the front ones of the rollers 19 abutting respective resilient pads 22, the frame being locked in position by a locking device 23. Such device 23 comprises a pivotally mounted two-armed lever 24 at one end of which is formed with a catch for engaging ratchet teeth 25 on the top of the drawbar 17. The other end of the lever 24 is movable against the action of a spring 26 by a hydraulic ram or the like 27 and is also connected to a similar two-armed pivotally mounted lever 28 by a connecting rod 29, appropriate movement of the ram 27 serving to disengage a tooth 30 of the lever 28 from its locating notch in the platform 13. It is to be noted that with this arrangement the major part of the towing strain is taken up by struts 21 so avoiding any undue strain on the locking device 23.

To tip the trailer the brakes 12 are applied, the ram 27 is operated to release the locking device 23 and also to release the tooth 30 from the platform 13, and the towing vehicle is reversed upon the trailer. Thus the drawbar assembly slides back into the trailer chassis so causing the rear ends of the struts 21 to rise and impart an upward and rearward thrust to the front end of the platform or load-carrying frame 13 to bring it into the tipping position. Dampers 31 are provided to restrain this movement so as to avoid undesirable high tipping speeds. Also it is to be noted that if the ram 27 is allowed to return to its original position after releasing the locking devices the ratchet teeth 25 will prevent the platform 13 returning to its original position during a tipping operation. When tipping is completed the ram 27 may again be operated to enable the platform to return to its original position upon forward movement of the towing vehicle relative to the trailer. A plate 32 is provided on the front of the drawbar 17 with spaced apertures 33 therein so that the platform or load-carrying frame 13 may be locked in one of several preselected tipping positions by inserting a peg into holes 34 in the struts 21 and into an appropriate aperture 33 in the plate 32.

FIG. 3 illustrates a further embodiment of the trailer of the invention which incorporates a number of modifications. In this embodiment the pivot point about which the load-carrying platform 35 tips has been moved rearwardly to give a better load-carrying weight distribution. This is achieved by extending the chassis channel members 10 rearwardly and providing members 36 which are connected to the platform 35 at one end and pivotally mounted on the chassis at their other end. It will be noted that the rollers 19 are spaced further apart in this embodiment and this is done to increase the stability of the platform 35 during tipping.

Under certain circumstances it may be desirable to provide a small pneumatic ram arrangement 37 on the chassis to assist initially in the lifting of the platform 35 at the commencement of a tipping operation. Such an arrangement 37 also serves the purpose of acting as a spring or damper when the platform is returned to its original position at the end of a tipping cycle.

To increase stability even further four sets of springs or dampers 38, 39 are provided between the chassis and the platform 35 and these replace the cushions 15 in the first embodiment.

The springs or dampers 38, 39 tend to eliminate rocking motion of the platform 35 relative to the chassis both during tipping and towing of the trailer.

Finally, if desired, the trailer may be provided with a suitable suspension, an example of which is illustrated in FIG. 3. A generally square-sectioned member 40 is mounted on the chassis at 41, such member being slidably disposed in a larger sectioned member 42 pivotally connected to one of the ground wheels 11 and which accommodates a spring and/or shock absorber (not shown) held in compression by the member 40. Said member 40 is prevented from being completely withdrawn from the member 42 by a pin or the like 43 which projects into a slot 44 in the larger member 42.

Thus it will be seen that the invention provides a very simple but efficient form of tipping gear utilizing the towing vehicle as the power source and yet requiring only the normal connection to the towing vehicle. The invention has particular application to trailers used in industry and agriculture, i.e., for transporting root crops, manure and the like, where frequent tipping and frequent hitching to and disconnection from tractors is involved, but the invention is not limited to such applications.

I claim:

1. A tipping trailer comprising a chassis supported on ground engaging wheels, a body pivoted on said chassis for movement between an original non-tipping position and a tipping position, a drawbar assembly operatively connected to said body and having a forward portion adapted for connection to a towing vehicle, said drawbar assembly being mounted on said chassis for movement between a forward position during towing and a rearward body tipping position, and releasable locking means for latching said drawbar assembly against movement relative to the trailer chassis in either position comprising a pivotally mounted lever having a ratchet tooth connection to said draw bar assembly, and means for actuating said lever.

2. A tipping trailer as claimed in claim 1, wherein the drawbar assembly is slidably mounted on the trailer chassis, and means being provided responsive to relative movement of the drawbar and trailer between said positions for tipping the trailer body.

3. A tipping trailer as claimed in claim 2 wherein the tipping means comprises two curved members pivotally mounted at spaced points to the forward end of the drawbar assembly and to the front end of the trailer body.

4. A tipping trailer as claimed in claim 1, wherein the trailer chassis includes two longitudinal channel members, the drawbar assembly comprising a frame carrying at each side rollers adapted to ride in said channel members.

5. A tipping trailer as claimed in claim 1, wherein the locking means further includes a second locking lever engageable with ratchet teeth provided on the drawbar assembly and also actuable by the said ram.

6. A tipping trailer as claimed in claim 1, wherein dampers are connected between the trailer chassis and the trailer body to restrain the movement of the body during a tipping operation.

7. A tipping trailer as defined in claim 1 including a second pivoted lever having a tooth engageable in a locating notch on said trailer body and means whereby said second lever is actuated to disengage said tooth from said body notch to permit tipping of said trailer body when said first mentioned lever is moved to drawbar release position.

* * * * *